United States Patent
Cesaretti et al.

(10) Patent No.: US 11,733,024 B2
(45) Date of Patent: Aug. 22, 2023

(54) USE OF CHANNEL INFORMATION TO GENERATE REDUNDANT ANGLE MEASUREMENTS ON SAFETY CRITICAL APPLICATIONS

(71) Applicant: Allegro MicroSystems, LLC, Manchester, NH (US)

(72) Inventors: Juan Manuel Cesaretti, Ciudad de Buenos Aires (AR); Andrea Foletto, Andorno Micca (IT)

(73) Assignee: Allegro MicroSystems, LLC, Manchester, NH (US)

( * ) Notice: Subject to any disclaimer, the term of this patent is extended or adjusted under 35 U.S.C. 154(b) by 121 days.

(21) Appl. No.: 17/363,732

(22) Filed: Jun. 30, 2021

(65) Prior Publication Data

US 2023/0003503 A1 Jan. 5, 2023

(51) Int. Cl.
| | | |
|---|---|---|
| G01R 33/09 | (2006.01) | |
| G01B 7/30 | (2006.01) | |
| G01D 5/14 | (2006.01) | |
| G01D 18/00 | (2006.01) | |

(52) U.S. Cl.
CPC .............. *G01B 7/30* (2013.01); *G01D 5/145* (2013.01); *G01D 18/00* (2013.01)

(58) Field of Classification Search
CPC .......... G01D 5/145; G01D 18/00; G01B 7/30
See application file for complete search history.

(56) References Cited

U.S. PATENT DOCUMENTS

| | | | |
|---|---|---|---|
| 6,288,533 B1 * | 9/2001 | Haeberli | A61K 48/00 324/207.2 |
| 8,324,891 B2 | 12/2012 | Kejik et al. | |
| 8,922,206 B2 | 12/2014 | Friedrich et al. | |
| 9,285,438 B2 | 3/2016 | Donovan et al. | |

(Continued)

FOREIGN PATENT DOCUMENTS

| | | |
|---|---|---|
| DE | 10320057 A1 | 12/2004 |
| DE | 10 2019 124371 | 2/2021 |

(Continued)

OTHER PUBLICATIONS

U.S. Applicant-Initiated Interview Summary dated Jul. 19, 2022 for U.S. Appl. No. 17/015,132; 18 Pages.

(Continued)

*Primary Examiner* — Alesa Allgood
(74) *Attorney, Agent, or Firm* — Daly, Crowley, Mofford & Durkee LLP (57) ABSTRACT

A sensor system and method use channel information to generate redundant angle measurements for sensing rotation of magnets about a given axis of rotation. It was observed that magnetic field strength on a circle, centered on the axis of rotation but in a plane perpendicular to it, have a component parallel to the axis that varies sinusoidally as a function of the angle around the circle. By placing magnetic field sensors equiangularly around such a circle, and summing their field strengths with appropriate weights, the angle of magnet rotation may be computed in a manner that is immune to the presence of stray fields. Moreover, fewer than all channels of sense data may be combined to form redundant estimates of the angle of rotation, to permit continued operation when one of the sensors has failed.

18 Claims, 6 Drawing Sheets

(56) References Cited

U.S. PATENT DOCUMENTS

| | | | |
|---|---|---|---|
| 9,411,023 | B2 | 8/2016 | Friedrich et al. |
| 9,488,461 | B2 * | 11/2016 | Honda .................... G01B 7/30 |
| 9,797,746 | B2 | 10/2017 | Vuillermet et al. |
| 10,132,879 | B2 | 11/2018 | Latham et al. |
| 10,380,879 | B2 | 8/2019 | Haas et al. |
| 10,580,289 | B2 | 3/2020 | Haas et al. |
| 10,636,285 | B2 | 4/2020 | Haas et al. |
| 10,692,362 | B2 | 6/2020 | Petrie et al. |
| 10,852,161 | B2 | 12/2020 | Cesaretti et al. |
| 10,908,232 | B2 | 2/2021 | Latham et al. |
| 2015/0022186 | A1 | 1/2015 | Ausserlechner |
| 2015/0061559 | A1 | 3/2015 | Nakamura |
| 2015/0142376 | A1 * | 5/2015 | Ausserlechner ....... G01D 5/145 702/151 |
| 2017/0248445 | A1 * | 8/2017 | Ausserlechner ..... G01D 5/2006 |
| 2019/0120659 | A1 | 4/2019 | Bussan |
| 2021/0072016 | A1 * | 3/2021 | Kollmitzer ............. G01D 5/145 |
| 2022/0075008 | A1 | 3/2022 | Romero |
| 2022/0357144 | A1 | 11/2022 | Tombez |

FOREIGN PATENT DOCUMENTS

| | | | |
|---|---|---|---|
| DE | 10 2020 214615 | | 5/2021 |
| EP | 3550269 | A1 | 10/2019 |

OTHER PUBLICATIONS

After Final Consideration Program and Amendment dated Aug. 2, 2022 for U.S. Appl. No. 17/015,132; 17 Pages.
U.S. Advisory Action dated Sep. 22, 2022 for U.S. Appl. No. 17/015,132; 3 pages.
Extended European Search Report dated Oct. 12, 2022 for European Patent Application No. 22168908.6; 7 pages.
Final Office Action dated May 2, 2022 for U.S. Appl. No. 17/015,132; 15 pages.
U.S. Appl. No. 17/015,132, filed Sep. 9, 2020, Romero.
U.S. Appl. No. 17/238,543, filed Apr. 23, 2021, Romero et al.
U.S. Appl. No. 17/380,244, filed Jul. 20, 2021, Cesaretti et al.
Office Action dated Nov. 29, 2021 for U.S. Appl. No. 17/015,132; 18 pages.
Response to Office Action dated Nov. 29, 2021 filed on Feb. 22, 2022 for U.S. Appl. No. 17/015,132; 14 pages.
Response to U.S. Final Office Action dated May 2, 2022 for U.S. Appl. No. 17/015,132; Response filed Aug. 2, 2022; 15 pages.
U.S. Advisory Action dated Aug. 23, 2022 for U.S. Appl. No. 17/015,132; 5 pages.
Response to U.S. Final Office Action dated May 2, 2022 for U.S. Appl. No. 17/015,132; Response filed Sep. 1, 2022; 15 pages.
Notice of Allowance dated Jan. 13, 2023 for U.S. Appl. No. 17/380,244; 13 pages.

* cited by examiner

USE OF CHANNEL INFORMATION TO GENERATE REDUNDANT ANGLE MEASUREMENTS ON SAFETY CRITICAL APPLICATIONS

FIELD

The disclosure pertains generally to arrangements for measuring magnetic variables, and more particularly to measuring direction of magnetic fields using Hall-effect devices.

BACKGROUND

Various standards have been developed to classify risk and define safety requirements, such as the Safety Integrity Level (SIL) used in the International Electrotechnical Commission (IEC) standard 61508. This standard has been adapted to the road vehicle industry specifically, namely as Automotive Safety Integrity Level (ASIL) defined by the International Organization for Standardization (ISO) standard 26262. The highest classification of injury risk that requires the most stringent level of safety measures is ASIL-D, required for safety critical automotive applications such as automotive control systems.

Figure 1:
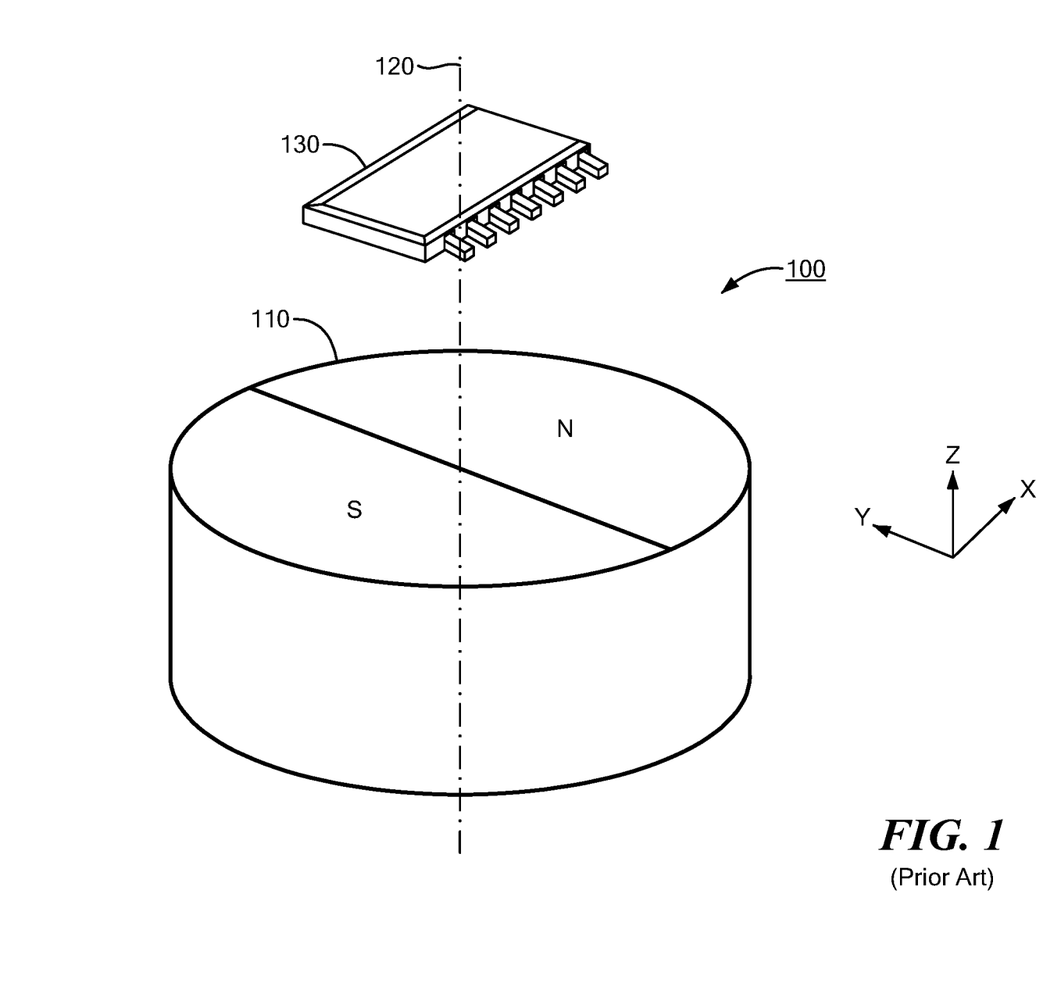
FIG. 1 schematically shows a diametric magnet that rotates about a given axis, and a sensor for sensing rotation of the magnet as known in the prior art.

Sensors often are used to measure angles in safety critical applications. For example, detecting the angle of rotation of an automobile steering column relative to its neutral position is important in signaling the electric power steering system assisting in wheel turning. One way this angle can be detected is by the use of a magnetic angle and rotation sensing system 100, as shown in FIG. 1. In the system 100, a rotating component (not shown) such as a steering column has affixed to it a cylindrical magnet 110 that is diametrically magnetized; that is, the North and South poles of the magnet 110 lie along a cross-sectional diameter as indicated, rather than along its central axis 120. Typically, the magnet 110 is made of rare earth elements (e.g. neodymium) that produce a strong local field for sensing. When the component rotates, the magnet 110 likewise rotates about its central axis 120, thereby changing the direction of the axis of magnetization (i.e. the direction from the South pole to the North pole). This results in a change in the orientation of the external, opposite magnetic field (i.e. from the North pole to the South pole), which may be sensed using a sensor 130 that is located in a plane parallel to a face of the cylindrical magnet 110. Typically, the sensor 130 contains compact, robust magnetic field sensors such as Hall plate sensors.

It is known from U.S. Pat. No. 10,636,285 to use multiple sensors with differing levels of sensitivity to generate different measurements (e.g. of pressure) in safety critical systems, and to use the multiple measurements to detect faults in the sensing system. Such faults may be a result of manufacturing defects, sensor degradation, external (i.e. environmental) interference, broken electrical connections, and so on.

SUMMARY OF DISCLOSED EMBODIMENTS

Disclosed embodiments provide an angle sensor system that is immune to stray magnetic fields; that is, it is sensitive to differential fields but not to common-mode fields. This is accomplished through the observation that magnetic field strength on a circle, centered on the axis of rotation but in a plane perpendicular to it, have a component parallel to the axis that varies sinusoidally as a function of the angle around the circle. By placing magnetic field sensors equiangularly around such a circle, and summing their field strengths with appropriate weights, the angle of magnet rotation may be computed in a manner that is immune to the presence of stray fields. Moreover, fewer than all channels of sense data may be combined to form redundant estimates of the angle of rotation, to permit continued operation when one of the sensors has failed.

Thus, a first embodiment is a sensor system for sensing rotation of a magnet about a given axis. The sensor system includes at least three magnetic field sensors, each sensor for sensing a strength of the magnetic field parallel to the given axis. The plurality of magnetic field sensors are arranged, in a plane perpendicular to the given axis, equiangularly around a circle whose center lies on the given axis. The sensor also includes electronic circuitry, coupled to the plurality of magnetic field sensors, for combining the respective sensed strengths into an output signal that represents an angle $\delta$ between a magnetization axis of the magnet and a fixed direction.

In some embodiments, at least one of the magnetic field sensors comprises a Hall-effect plate sensor.

In some embodiments, the magnet comprises a diametric cylinder magnet and the plurality of magnetic field sensors comprises at least four magnetic field sensors.

In some embodiments, the magnet does not comprise a diametric cylinder magnet and the plurality of magnetic field sensors comprises at least five magnetic field sensors.

In some embodiments, the electronic circuitry is configured for combining the sensed strengths in a manner that is insensitive to common-mode components of the magnetic field present at each of the magnetic field sensors.

Let n denote the total number of the plurality of magnetic field sensors, and let $H_i$ denote the strength, of the magnetic field perpendicular to the plane, sensed by an ith one of the magnetic field sensors. Then in some embodiments, the electronic circuitry includes a main angle derivation circuit for combining the sensed strengths, from the total number n of the plurality of magnetic field sensors, into a main value for the angle $\delta$ according to the formula $$\delta = \tan^{-1}\left(\frac{\Sigma_{i=1}^{n} H_i \cdot \sin\left(2\pi\left(\frac{i-1}{n}\right)\right)}{\Sigma_{i=1}^{n} H_i \cdot \cos\left(2\pi\left(\frac{i-1}{n}\right)\right)}\right).$$

In some embodiments, the electronic circuitry further includes a plurality of subsidiary angle derivation circuits, each subsidiary angle derivation circuit for combining the sensed strengths, from a different subset of fewer than the total number of the plurality of magnetic field sensors, to form a respective redundant value for the angle $\delta$.

In some embodiments, the electronic circuitry further includes a main angle comparator circuit for comparing the redundant values for the angle $\delta$ produced by each of the plurality of subsidiary angle derivation circuits to determine whether a magnetic field sensor is faulty.

In some embodiments, the electronic circuitry further includes a main angle comparator circuit for determining a most likely value for the angle $\delta$ by comparing the redundant values for the angle $\delta$ according to a majority vote.

Some embodiments include both a main angle comparator circuit and a redundant angle comparator circuit, both circuits for comparing the redundant values for the angle $\delta$ Another embodiment is a method of sensing rotation of a magnet about a given axis. The method includes sensing a strength of the magnetic field parallel to the given axis, by each of a plurality of at least three magnetic field sensors. The magnetic field sensors are arranged, in a plane perpendicular to the given axis, equiangularly around a circle whose center lies on the given axis. The method also includes combining the respective sensed strengths, by electronic circuitry coupled to the plurality of magnetic field sensors, into an output signal that represents an angle δ between a magnetization axis of the magnet and a fixed direction.

In some embodiments, sensing the strength of the magnetic field by a magnetic field sensor comprises sensing using the Hall effect.

In some embodiments, the magnet comprises a diametric cylinder magnet and the plurality of magnetic field sensors comprises at least four magnetic field sensors.

In some embodiments, the magnet does not comprise a diametric cylinder magnet and the plurality of magnetic field sensors comprises at least five magnetic field sensors.

In some embodiments, combining the sensed strengths into the output signal comprises combining the sensed strength in a manner that is insensitive to common-mode components of the magnetic field present at each of the magnetic field sensors.

With notation as above, in some embodiments, combining the sensed strengths comprises computing a main value for the angle δ according to the formula $$\delta = \tan^{-1}\left(\frac{\sum_{i=1}^{n} H_i \cdot \sin\left(2\pi\left(\frac{i-1}{n}\right)\right)}{\sum_{i=1}^{n} H_i \cdot \cos\left(2\pi\left(\frac{i-1}{n}\right)\right)}\right).$$

In some embodiments, combining the sensed strengths comprises combining sensed strengths, from each of a plurality of different subsets of fewer than the total number of the plurality of magnetic field sensors, to form a respective redundant value for the angle δ.

Some embodiments of the method further include comparing the redundant values for the angle δ to determine whether one of the magnetic field sensors is faulty.

Some embodiments of the method include determining a most likely value for the angle δ by comparing the redundant values for the angle δ according to a majority vote.

Some embodiments of the method further include comparing the redundant values for the angle δ by both a main angle comparator circuit and a redundant angle comparator circuit.

It is appreciated that the concepts, techniques, and structures disclosed herein may be embodied in other ways, and that the above summary of disclosed embodiments is thus meant to be illustrative rather than comprehensive or limiting.

DESCRIPTION OF THE SEVERAL VIEWS OF THE DRAWINGS

The manner and process of making and using the disclosed embodiments may be appreciated by reference to the drawings, of which.

DETAILED DESCRIPTION OF EMBODIMENTS

Figure 2:
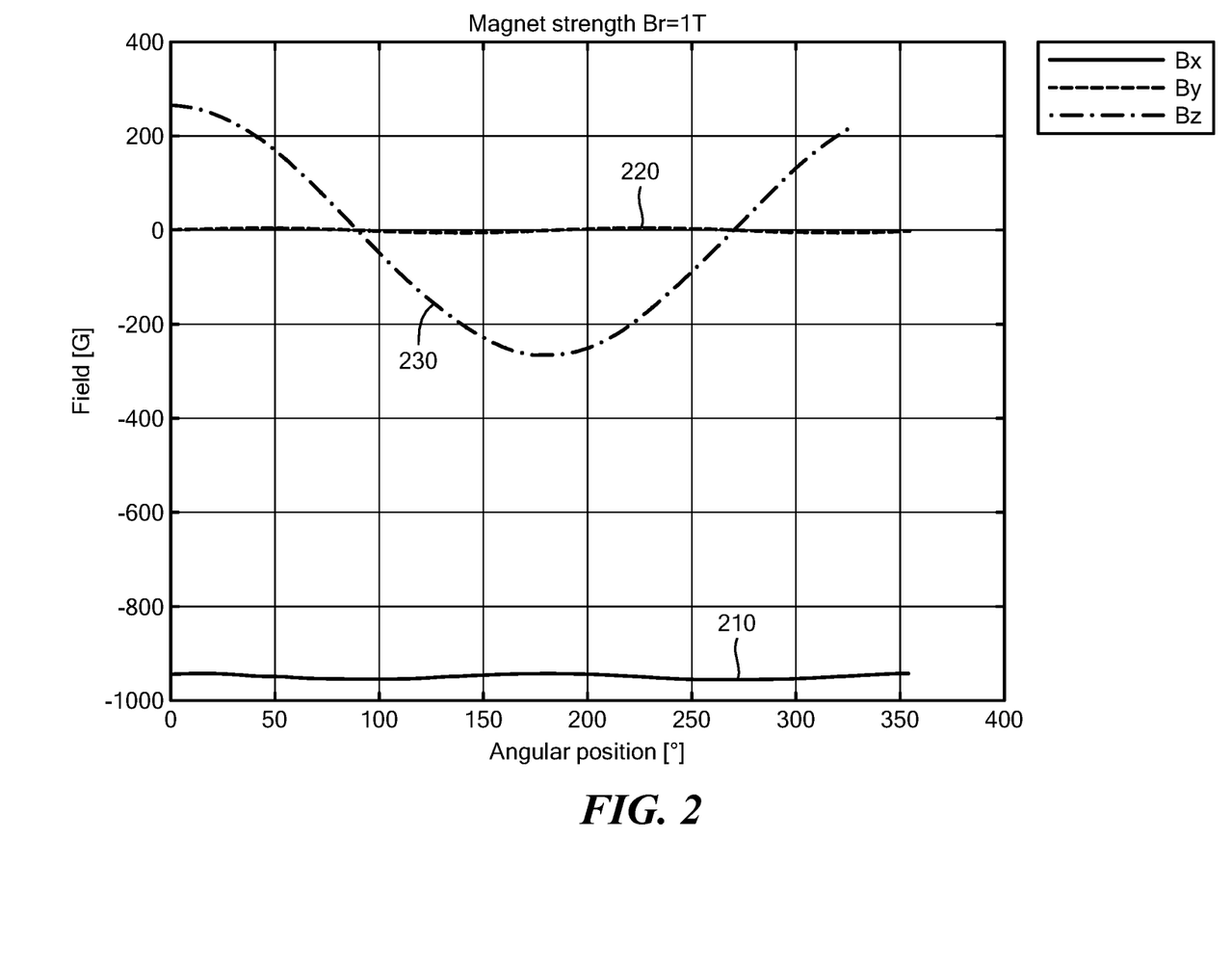
FIG. 2 is a plot of simulated magnetic field strength in each of three directions at points around a circle in the sensing plane of FIG. 1.

To illustrate the detection principle generally, in FIG. 2 is shown a plot of simulated magnetic field strength in each of three directions at points around a circle in the sensing plane of FIG. 1. The magnet being sensed may be the diametrically-magnetized magnet 110, and is oriented with its North pole in the +X direction and its South pole in the −X direction. The system is configured so that the magnet may rotate about an axis of rotation, which may be central axis 120. However, to generate the plots shown in FIG. 2, the magnet is held fixed as described above, while its magnetic field is sensed. The sensing plane contains the sensor, which may be sensor 130, and is a distance above the magnet and oriented in a plane parallel to the top surface of the magnet. Simulated magnetic field sensors were placed in the sensing plane a fixed distance from the intersection of the plane with the axis of rotation, and the magnetic field strength in each of the three coordinate directions, appearing at these sensors as a function of their angular position from the X axis, were computed and are shown in FIG. 2 for a 1 Tesla magnet.

The magnetic field $B_X$ in the X direction is shown by curve 210. This curve 210 is relatively flat and shows a field of approximately −950 Gauss (i.e., a field uniformly in the −X direction with a strength of 950 Gauss). This reflects the fact that the sensed field will have a North-to-South orientation that opposite of the South-to-North magnetization internal to the magnet itself. Notably, however, the sensed field strength is approximately independent of the angular position of the sensor around the circle in the sensing plane. Rather, this sensed field is a function of the distance of the sensor plane above the magnet, and will become weaker as this distance increases.

The magnetic field $B_Y$ in the Y direction is shown by curve 220. This curve 220 is also relatively flat and shows a field of approximately 0 Gauss. This reflects the fact that, when the magnetization direction of the magnet is South-to-North, the sensed external magnetic field will be North-to-South, and thus have no component in the +Y (i.e. East-to-West) or −Y (i.e. West-to-East) directions for small distances from the magnet's axis of rotation.

The magnetic field $B_Z$ in the Z direction is shown by curve 230. This curve 230 oscillates sinusoidally based on the angular position of the sensor, having its maximum value for the (simulated) sensor farthest in the +X (i.e. North) direction and having its minimum value for the sensor farthest in the −X (i.e. South) direction. The maximum and minimum values of the sensed field have approximately the same magnitudes, about 250 Gauss, but in opposite directions. This reflects the fact that the external magnetic field lines curve in the Z direction from the North pole to the South pole, curving in the +Z direction (i.e. away from the magnet)

on the North side of the sensing plane and curving in the −Z direction (i.e. toward the magnet) on the South side of the sensing plane.

It is appreciated in accordance with embodiments of the concepts, techniques, and structures disclosed herein that the regular, sinusoidal behavior of the Z-component of the magnetic field in the sensing plane may be used to detect rotation of the magnet about a stationary sensor system having multiple magnetic field sensors contained within. It is further appreciated that three or more magnetic field sensors, arranged in a circle centered in the plane about its intersection with the axis of rotation of the magnet, provide multiple channels of information that may be used not only to detect fault in the sensor integrated circuit as known in the prior art, but that may be combined to add redundancy to the detection so that the angle of rotation of the magnet may be accurately sensed even if one of the magnetic field sensors fails.

Figure 3:
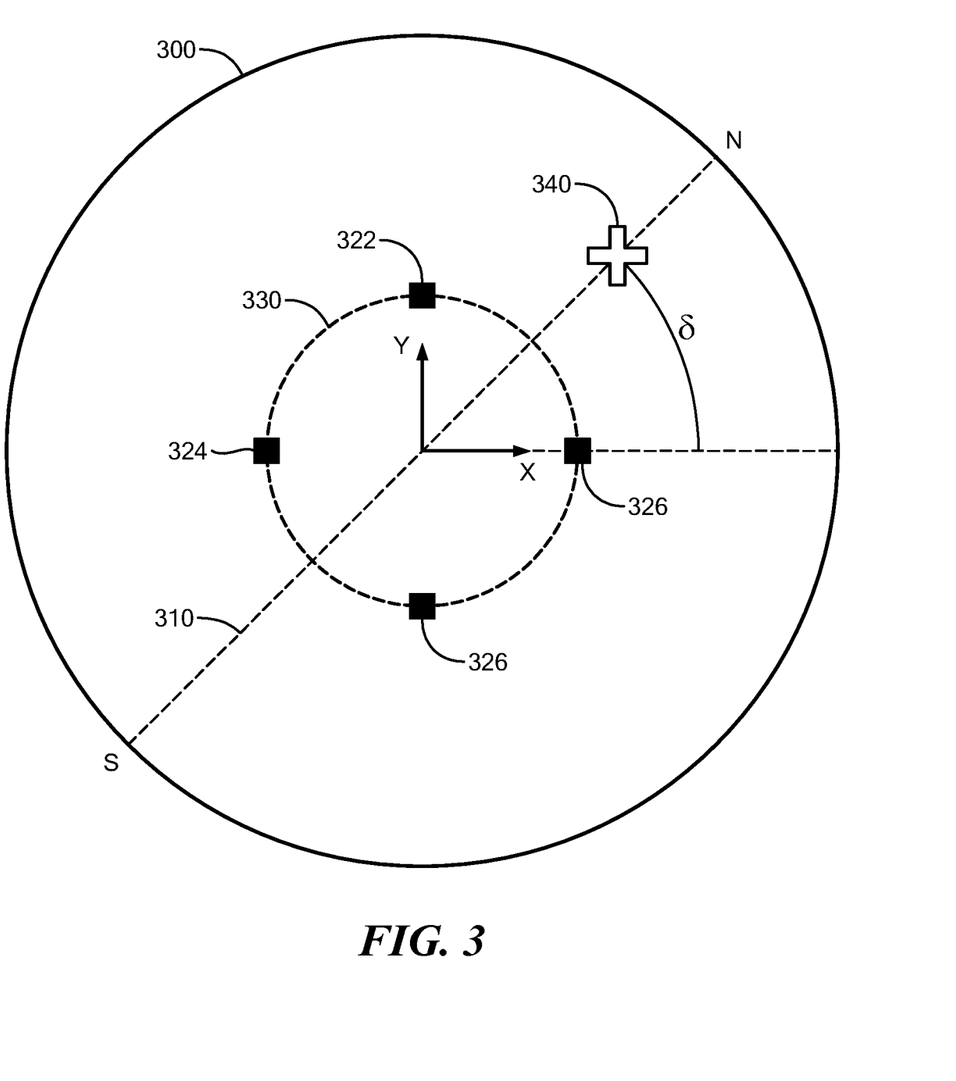
FIG. 3 is a cartoon of a magnet and four Hall plate sensors arranged equiangularly around a circle in the sensing plane in accordance with an embodiment.

Thus, in FIG. 3 is shown a cartoon of a top-down view of a magnet and four magnetic field sensors arranged equiangularly around a circle in the sensing plane in accordance with an embodiment. FIG. 3 has the indicated coordinate system, with the +X axis toward the right and the +Y axis toward the top. The +Z axis (not shown) is, by the right-hand rule, out of the figure toward the reader. In embodiments, the +X axis may be chosen as a neutral position of the magnet 300, i.e. one in which its axis of magnetization 310 is in a position that corresponds to a passive, rather than active, state of the control system.

The axis of magnetization 310 in FIG. 3 is offset from its neutral position along the X axis due to rotation of the magnet 300 about its axis of rotation (i.e. the Z axis) by an angle δ. In accordance with embodiments, the angle δ is computed using the outputs of four magnetic field sensors 320, 322, 324, 326. Any or all of the magnetic field sensors may be, illustratively, Hall-effect plate sensors. Each of the magnetic field sensors 320-326 senses a strength of the magnetic field in the Z direction, i.e. in a direction parallel to the axis of rotation of the magnet 300. The magnetic field sensors 320-326 themselves are contained in a plane perpendicular to the axis of rotation, i.e. in a sensing plane above the magnet 300. The magnetic field sensors 320-326 are further arranged equiangularly around the circle 330, whose center lies on the intersection between the sensing plane and the +Z axis. That is, the center of the circle 330 lies on the axis of rotation of the magnet 300.

Figure 4A:
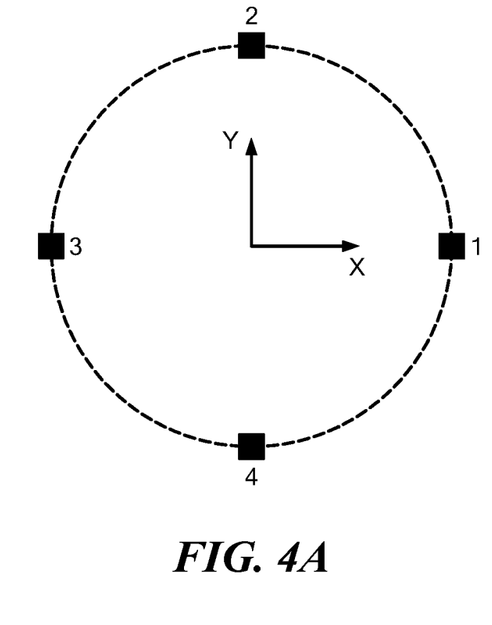
FIGS. 4A, 4B, and 4C indicate placement of four, five, and six magnetic field sensors, respectively, arranged equiangularly around circles in accordance with various embodiments.
Figure 4B:
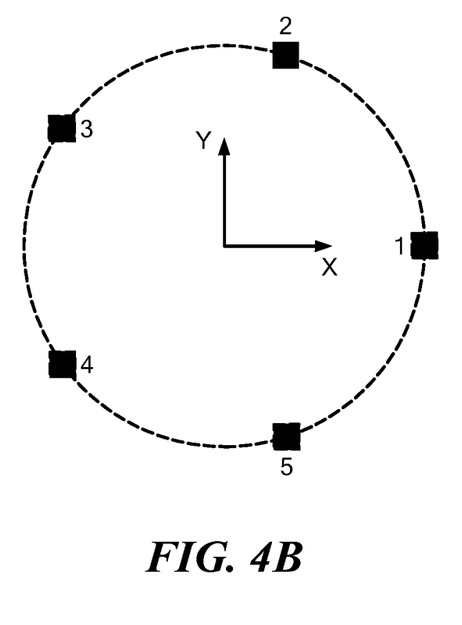
Figure 4C:
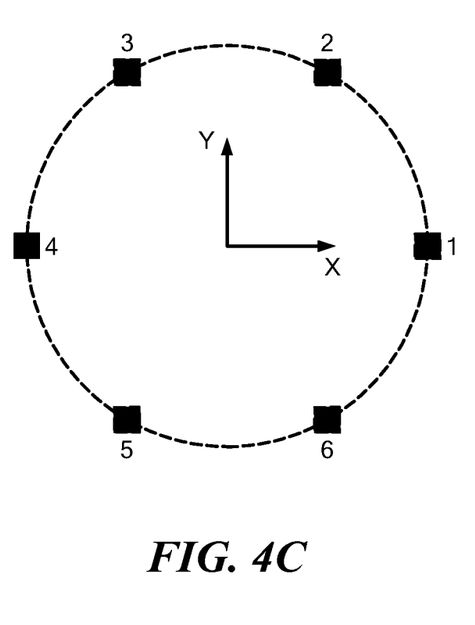

Generally, one may use different numbers of magnetic field sensors to compute the angle δ, provided the sensors are arranged in the sensing plane equiangularly around a circle centered on the axis of rotation. Let n denote the total number of magnetic field sensors, where n is at least three. FIGS. 4A, 4B, and 4C indicate placement of n=4, n=5, and n=6 magnetic field sensors, respectively, arranged equiangularly around circles in accordance with various embodiments. By the word equiangularly, it is meant that sensor #1 is placed on the +X axis, and the remaining n−1 sensors are placed so that the angle subtended by the arc between two circumferentially adjacent sensors from the center of the circle is 2π/n radians or 360/n degrees. That is, assuming a circle of radius 1, the magnetic field sensor #i has position $(x_i, y_i) = (\cos(2\pi(i-1)/n), \sin(2\pi(i-1)/n))$ in the coordinate system of the sensor plane. In practical embodiments, the radius of the circle of sensors may be selected, according to the dimensions of the magnet and the design parameters of the sensor system, so that a Z component of the magnetic field present at each sensor is strong enough to permit accurate measurement.

With this notation, the angle δ of the rotation of the magnet is computed as follows. Let $H_i$ denote the strength of the magnetic field perpendicular to the sensing plane, sensed by an ith one of the magnetic field sensors. Then the angle δ of the rotation of the underlying magnet is $$\delta = \tan^{-1}\left(\frac{\sum_{i=1}^{n} H_i \cdot \sin\left(2\pi\left(\frac{i-1}{n}\right)\right)}{\sum_{i=1}^{n} H_i \cdot \cos\left(2\pi\left(\frac{i-1}{n}\right)\right)}\right).$$

That is, the magnetic field sensed by each sensor is weighted by its planar coordinates, the results are summed to produce x and y coordinates of a point 340 in the sensor plane above the axis of magnetization 310, then the inverse tangent of the ratio y/x is computed to identify the angle δ. For the illustrative embodiment of FIG. 3 with n=4 magnetic field sensors 320 (sensing $H_1$), 322 (sensing $H_2$), 324 (sensing $H_3$), and 326 (sensing $H_4$), one thus computes $$\delta = \tan^{-1}\left(\frac{H_2 - H_4}{H_1 - H_3}\right).$$

It is appreciated that the equiangular arrangement of sensors around a circle permits the computation of the angle δ to be advantageously immune from the effects of common-mode (i.e. uniform) magnetic fields, especially environmental magnetic fields. As indicated above in the discussion of FIG. 2, the components of such fields in the X and Y directions are irrelevant, so denote by H the magnitude of a uniform magnetic field in the Z direction that is present at each of the sensors of FIG. 3. H will be positive if the field is in the +Z direction, and negative if the field is in the −Z direction. The combined magnetic field from both the magnet and the common-mode field that is sensed by sensor #i has the value $H_i + H$. For the embodiment of FIG. 3, one computes $$\delta = \tan^{-1}\left(\frac{(H_2 + H) - (H_4 + H)}{(H_1 + H) - (H_3 + H)}\right) = \tan^{-1}\left(\frac{H_2 - H_4}{H_1 - H_3}\right)$$

as before. The value of the common-mode field H does not appear in the final result; that is, the computation of δ is not affected by the presence of a uniform stray field.

It is appreciated that, beyond the four magnet embodiment of FIG. 3, adding a uniform value H to each sensor's reading in the formula for an arbitrary number n of magnetic field sensors (e.g. as exemplified by FIGS. 4A-4C) yields the same result, namely insensitivity to common-mode components of the magnetic field. One may demonstrate this using ordinary trigonometric methods on the general n-sensor formula above. The actual computation of the angle δ may be performed by electronic circuitry coupled to the magnetic field sensors, as described below in connection with the sensor system shown in FIG. 5.

It has been noted that intrinsic angular error—that is, the error in an ideal system without mechanical tolerances and without any measurement error—is zero only if the target magnet is cylindrical, i.e. a magnet with circular symmetry that matches the symmetry of the magnetic field sensor arrangement. In particular, if the magnet is a diametrically magnetized cylinder magnet, it has been found that four magnetic field sensors is sufficient, although more may be employed. If the target magnet is not cylindrical, then intrinsic angular error will not be zero, but may be reduced by increasing the number n of magnetic field sensors. Thus, if the target magnet is not a diametric cylinder magnet, then five or more magnetic field sensors should be used. It should be noted that embodiments may be used with a target magnet of any arbitrary shape, and the disclosure herein should not be construed as limiting embodiments to use with only diametrically magnetized cylinders.

In practical embodiments, the circle of sensors may be misaligned with the axis of rotation of the target magnet. In such cases, the sinusoidal variation of sensed $B_Z$ indicated in FIG. 2 is still present, but may be shifted so that the maximum and minimum magnitudes of sensed field strengths are different. That is, if the center of the circle of sensors is closer to the North pole of the target magnet, then the maximum sensed field in the +Z direction will have greater magnitude than the minimum sensed field in the −Z direction. The sensing architecture allows for some misalignment with minimal impact on angle error.

Figure 5:
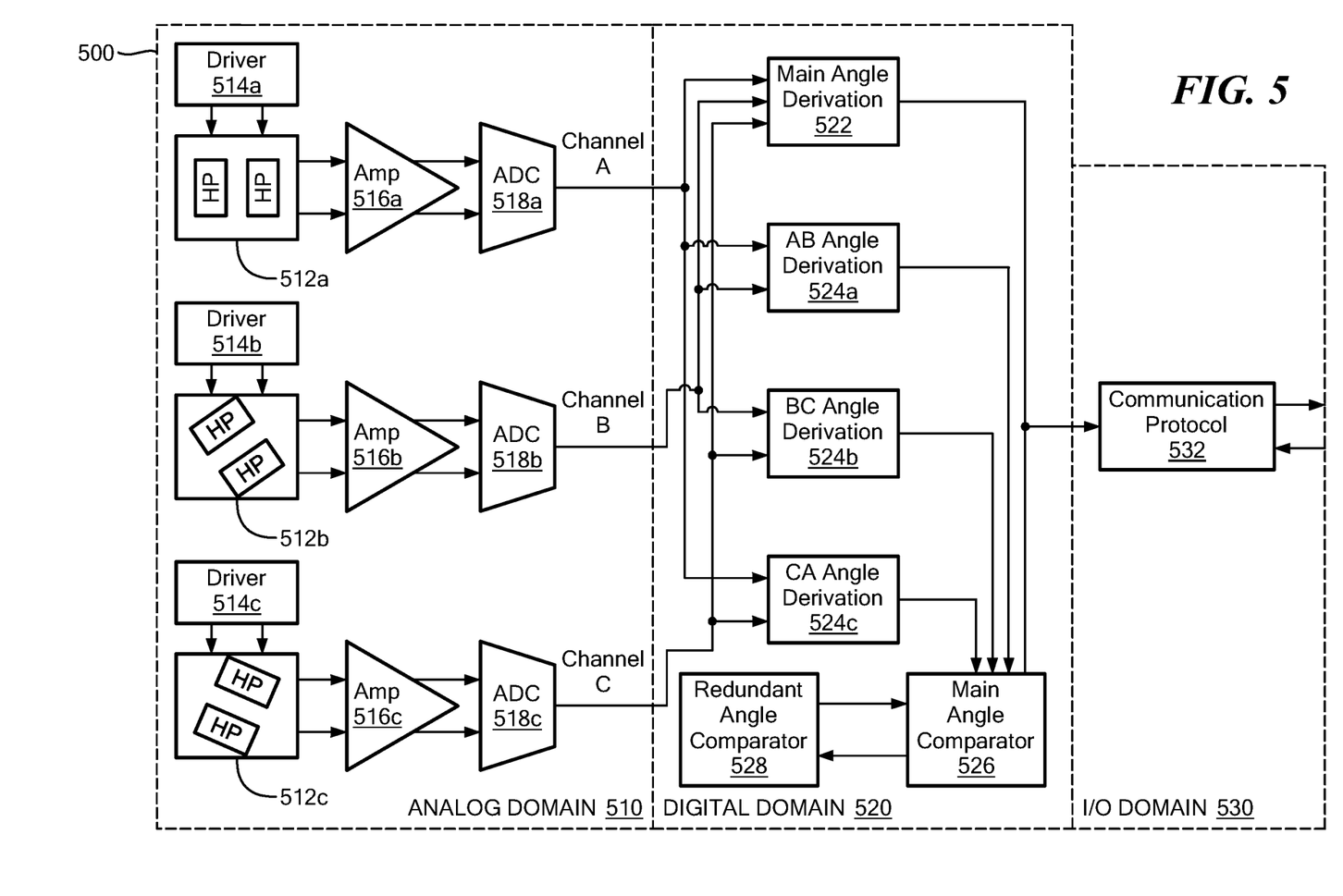
FIG. 5 is simplified diagram of a sensor system for combining respective sensed field strengths into an output signal in accordance with an embodiment.

FIG. 5 is simplified diagram of a sensor system 500 for combining respective sensed field strengths into an output signal in accordance with an embodiment. The sensor system 500 may be implemented in practical embodiments as an integrated circuit (IC), especially as an application-specific integrated circuit (ASIC). The sensor system 500 is functionally organized according to an analog domain 510 in which signals carry information using a continuum of electrical values, a digital domain 520 in which signals carry information using discrete values (i.e. zeroes and ones), and an input/output (I/O) domain 530 for communicating with external circuitry that consumes these discrete values (e.g. an automotive control system or head end). The I/O domain 530 includes a communication circuit 532 that implements a communication protocol whose details are not relevant to the present disclosure, and which is not further discussed. A person having ordinary skill in the art will appreciate how to implement the communication circuit 532 using techniques known in the art.

The analog domain 510 produces several channels of information, labeled Channel A, Channel B, and Channel C, regarding the strength of the sensed magnetic field. Each channel derives its information from a pair of Hall-effect plate sensors having a different physical orientation with respect to the target magnet, but otherwise operates in identical fashion. It should be understood that magnetic field sensors other than Hall-effect plates may be used in embodiments, and that the description of such sensors as using the Hall effect in what follows is thus illustrative of the general principle.

The sensor system 500 includes three pairs of Hall-effect plate sensors 512a, 512b, 512c. Thus, the sensor system 500 uses n=6 magnetic field sensors in the configuration of FIG. 4C. More concretely, the pair of sensors 512a are sensors #1 and #4; the pair of sensors 512b are sensors #3 and #6; and the pair of sensors 512c are sensors #2 and #5. While FIG. 5 shows these pairs of sensors 512a, 512b, 512c as being physically separated, it should be understood that all six sensors are arranged in a circular formation as described above. Thus, FIG. 5 is not intended to represent physical positions of the sensors, but rather is used to illustrate the operation of the circuitry coupled to those sensors.

As described above, embodiments of the concepts, techniques, and structures disclosed herein may include greater than or fewer than the six magnetic field sensors shown in FIG. 5. Therefore, this figure should be understood to illustrate the principles and circuitry involved in converting sensed magnetic fields into an angle δ of the underlying target magnet, and should not be viewed as limiting embodiments to exactly six sensors. Using paired sensors is advantageous because it yields sensed magnetic field strengths of approximately the same magnitude but in opposite directions, thus providing a large, differential signal in accordance with the formulas above; however, the use of paired sensors is not mandatory in embodiments. Thus, a channel may derive its information from any number of sensors.

Moreover, although FIG. 5 shows six sensors used to generate three information channels, embodiments of the concepts, techniques, and structures disclosed herein may provide more than three channels of information for greater redundancy. While an accurate angle measurement may be obtained from only two channels of sense data, having three or more channels proves greater accuracy. Also, having additional channels permits continued operation in the event that one of the channels fails, as described below.

Each pair of Hall-effect plate sensors 512a, 512b, 512c is electrically driven by respective driver circuits 514a, 514b, 514c as known in the art, thereby permitting each pair to output a respective electronic signal having desired electrical properties (e.g. a voltage or a current that is proportional to the sensed magnetic field or field differential). These electronic signals are fed into corresponding channel amplifiers 516a, 516b, 516c to increase their respective electrical powers, then into analog-to-digital converters 518a, 518b, 518c whose outputs digitally encode samples of the sensed magnetic field strengths in Channels A, B, and C.

The channel signals now encode digital data representing the respective sensed magnetic field strengths that is combined by the digital domain 520 into an output signal that represents the angle δ between the magnetization axis of the target magnet and a fixed direction (e.g. the +X direction or a "neutral position" direction). In accordance with embodiments, digital signals from all available channels (e.g. all three channels A, B, and C in illustrative sensor system 500) are sent into a main angle derivation circuit 522 for combining the sensed strengths into a main value for the angle δ The main angle derivation circuit 522 performs the trigonometric and arithmetic functions required to implement the formulas above for computing δ, i.e. sines and cosines, multiplication, addition, division, and arctangents. Any circuitry known in the art for performing these mathematical functions may be used, especially a CORDIC circuit as known in the art. The output of the main angle derivation circuit 522 is a digital value that encodes the angle δ, for provision to a consumer of angle data using the communication circuit 532.

In various embodiments used in safety critical applications, redundancy is provided using multiple subsidiary angle derivation circuits that combine the channel data (i.e. the sensed magnetic strengths) from fewer than all of the channels. In the sensor system 500, subsidiary angle derivation circuits 524a, 524b, 524c respectively combine data from channels A & B, channels B & C, and channels A & C to form respective redundant values for the angle δ. Thus, in the example sensor system 500, the main angle derivation circuit 522 uses the formula for δ having n=6 (using the differential magnetic field sensed by sensors #1 and #4 on Channel A, sensors #3 and #6 on Channel B, and sensors #2 and #5 on Channel C). However, the subsidiary angle derivation circuit 524a uses the formula for δ for two channels, applying the appropriate trigonometric conversions. The subsidiary angle derivation circuit 524a does not use magnetic field sense data from Channel C (i.e. from sensors #2 and #5). Similarly, the subsidiary angle derivation circuits 524b and 524c use the formula for δ with n=4 and sense data from the appropriate respective sensor pairs.

Thus, each subsidiary angle derivation circuit combines the sensed strengths from a different subset of fewer than all of the magnetic field sensors to form a respective redundant value for the angle δ.

As indicated above, only two channels of magnetic field sense data are needed to compute the angle δ so each of the subsidiary angle derivation circuits 524a-524c may be used to independently compute the value of this angle (albeit with slightly less precision than the main angle derivation circuit 522), and output a digital encoding thereof. In embodiments having more than three channels, each subsidiary angle derivation circuit may combine sense data from any subset of the available channels, especially from two or more channels having linearly independent sense data.

When all pairs of magnetic field sensors 512a-512c are operating without error, the main angle derivation circuit 522 and the three subsidiary angle derivation circuits 524a-524c will produce values for the angle δ that substantially agree. Thus, under ordinary operation, the sensor system 500 may output, using the communication circuit 532, the most precise estimate of the angle δ derived from the largest number of channels, i.e. the main value for the angle δ from the main angle derivation circuit 522.

But, if any of the Hall-effect plates experiences an error, thereby distorting encoded samples of the sensed magnetic field strengths in one of the channels, then the main angle derivation circuit 522 and the three subsidiary angle derivation circuits 524a-524c will produce values for the angle δ that substantially disagree. In particular, the subsidiary angle derivation circuits that receive data from functional channels will compute one value for the angle δ while the subsidiary angle derivation circuits that receive data from the channel with the error sensor will compute another value for the angle δ that is significantly different.

In the sensor system 500, a main angle comparator 526 receives the computer values for the angle δ from the subsidiary angle derivation circuits 524a-524c to detect a disagreement among the computed angles, thereby signifying that a magnetic field sensor is faulty or the existence of some other error condition (e.g. a loose connection inside the sensor system 500). The main angle comparator 526 may respond to detection of an error condition by signaling the error to the consumer of the angle data using the communication circuit 532.

The main angle comparator 526 may use an auxiliary redundant angle comparator circuit 528 to avoid the angle comparator being a single point of failure in the sensor system 500. In this disclosure, it should be understood that any described functions of the main angle comparator circuit 526 may be performed by the redundant angle comparator circuit 528 if the main angle comparator circuit 526 fails for any reason.

In accordance with some embodiments having more than three channels, the safety-critical sensor system may continue to operate in the presence of the error condition for a period of time with less precise, but still accurate, measurement of the angle δ derived from the subsidiary angle sensors. To achieve this, the main angle comparator circuit may determine a most likely value for the angle δ by comparing redundant values for the angle δ from all of the subsidiary angle derivation circuits according to a majority vote.

Consider a sensor system built according to the design shown in FIG. 5, but with four Channels A, B, C, and D rather than only three channels. Such a sensor system would have a main angle derivation circuit, and subsidiary angle derivation circuits using data from pairs of the channels. That is, the sensor system would have six angle circuits using data from channel pairs A & B, A & C, A & D, B & C, B & D, and C & D. Suppose that channel A began to produce bad values for the sensed magnetic field strength due to a faulty sensor. Then the first three angle circuits (i.e. those using data from Channel A) would produce values for the angle δ that substantially disagree with each other, while the latter three angle circuits (i.e. those not using data from Channel A) would produce values for the angle δ that substantially agree. In this situation, a majority vote among the subsidiary angle circuits would select the common value of the latter three circuits, producing an accurate value for the angle δ albeit a value that is less precise than what would be obtained from the main angle derivation circuit if all four channels were providing correct data.

It is appreciated that sensor systems having more than three channels in accordance with embodiments of the concepts, techniques, and structures disclosed herein may consume more current or electrical power than three-channel embodiments. Many-channel embodiments also may require more surface area on the integrated circuit die leading to larger sensor chips, and have other potential impact on system design. Thus, the system designer should consider these factors, and weigh whether the added costs of many channels is worth reducing the effect of a single component failure and potentially continuing to operate under partial failure conditions.

While the sensor system 500 of FIG. 5 shows n=6 magnetic field sensors, other embodiments may use more or fewer sensors. Thus, a sensor system may use n=4 sensors as shown in FIG. 4A, or n=5 sensors as shown in FIG. 4B, or n>6 sensors equiangularly arranged around a circle in accordance with the principles disclosed herein. A person having ordinary skill in the art should understand how the sensor system 500 would be modified to accommodate different numbers of magnetic field sensors, so detailed elaboration on such modifications is not further provided.

Figure 6:
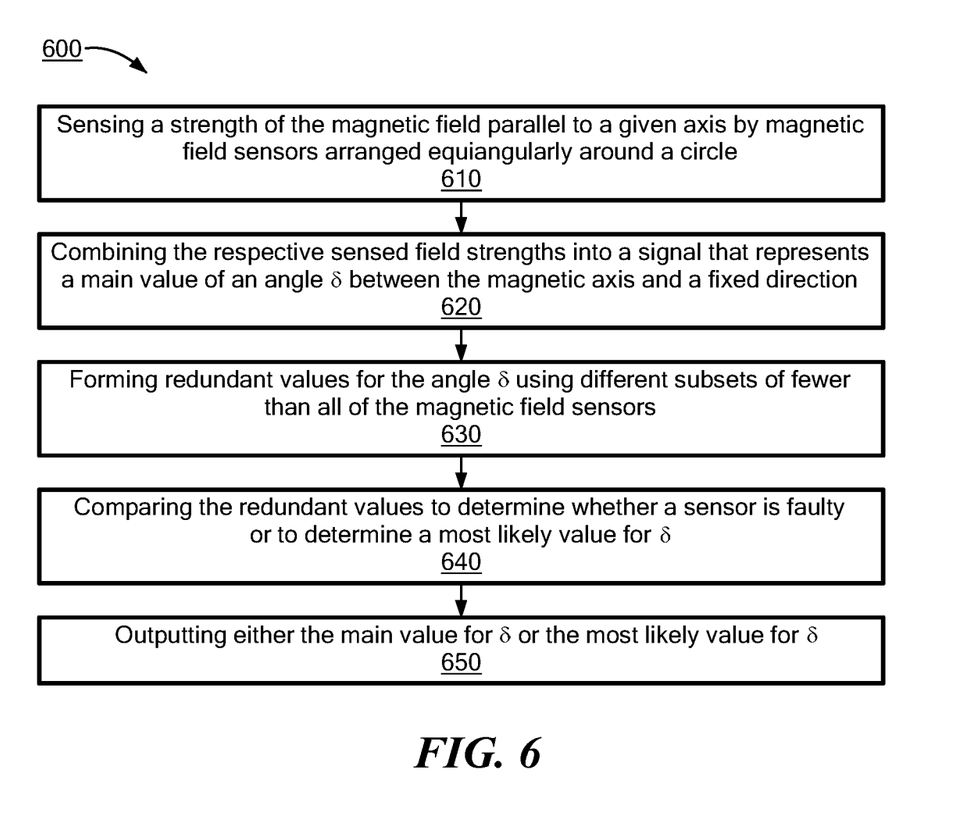
FIG. 6 is a flowchart of a method for sensing rotation of a magnet about a given axis in accordance with an embodiment.

FIG. 6 is a flowchart of a method 600 for sensing rotation of a magnet about a given axis in accordance with an embodiment. The method 600 may be performed by a sensor system, such as the sensor system 500 shown in FIG. 5, or by other electrical or electronic hardware.

The method 600 begins with a process 610 sensing a strength of the magnetic field parallel to the given axis, by each of a plurality of at least three magnetic field sensors arranged, in a plane perpendicular to the given axis, equiangularly around a circle whose center lies on the given axis. Sensing may be illustratively performed by plate sensors using the Hall effect, or other magnetic field sensors suited to detecting magnetic fields in a chosen direction. If the magnet includes a diametric cylinder magnet, the plurality of magnetic field sensors may include at least four magnetic field sensors. Otherwise, if the magnet does not possess circular symmetry, then the plurality of magnetic field sensors may include at least five magnetic field sensors.

The method continues with a process 620 combining the respective sensed strengths, by electronic circuitry coupled to the plurality of magnetic field sensors, into an output signal that represents an angle δ between a magnetization axis of the magnet and a fixed direction. The electronic circuitry may illustratively include amplifiers, analog-to-digital converters, CORDIC circuits, and other circuitry as described above in connection with FIG. 5. The output signal may be provided by circuitry performing a communication protocol with external data consumers.

The sensed strengths may be combined in a manner that is insensitive to common-mode components of the magnetic field present at each of the magnetic field sensors, especially as described above in connection with FIG. 4. In particular, if n denotes the total number of the plurality of magnetic field sensors and $H_i$ denotes the strength, of the magnetic field perpendicular to the plane, sensed by an ith one of the magnetic field sensors, then the sensed strengths may be combined by computing a main value for the angle $\delta$ according to the formula $$\delta = \tan^{-1}\left(\frac{\sum_{i=1}^{n} H_i \cdot \sin\left(2\pi\left(\frac{i-1}{n}\right)\right)}{\sum_{i=1}^{n} H_i \cdot \cos\left(2\pi\left(\frac{i-1}{n}\right)\right)}\right).$$

The method 600 may continue with a process 630 forming redundant values for the angle $\delta$. This may be accomplished using subsidiary angle derivation circuitry as described above. In particular, respective redundant values for the angle $\delta$ may be the result of combining sensed strengths from each of a plurality of different subsets of fewer than the total number of the plurality of magnetic field sensors. In other words, sensed strengths from single sensors, or sensed differential strengths from paired sensors, may be digitized into channels representing the magnetic field in different directions from the center of the circle, and data from these channels may be combined pairwise (or in greater numbers) to form the redundant values for the angle $\delta$.

The redundant values for the angle $\delta$ may be used as described above in connection with FIG. 5. Thus, the method 600 may next include a process 640 comparing the redundant values to determine whether one of the magnetic field sensors is faulty, and/or according to a majority vote to determine a most likely value for the angle $\delta$. The process 640 may be performed by both a main angle comparator circuit and a redundant angle comparator circuit to lessen the chance that angle comparison is a single point of failure.

Finally, the method 600 concludes with a process 650 outputting either the main value for the angle $\delta$ determined by process 620 (in case of normal operation) or the most likely value for $\delta$ determined by process 640 (in case of abnormal operation). It is appreciated that the method 600 may alternately output an error signal in case of abnormal operation of a sensor system having only three channels of magnetic sense data.

In the foregoing detailed description, various features of embodiments are grouped together in one or more individual embodiments for the purpose of streamlining the disclosure. This method of disclosure is not to be interpreted as reflecting an intention that the claims require more features than are expressly recited therein. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A sensor system for sensing rotation of a magnet about a given axis, the sensor system comprising:
a plurality of at least three magnetic field sensors, each sensor for sensing a strength of the magnetic field parallel to the given axis, the plurality of magnetic field sensors arranged, in a plane perpendicular to the given axis, equiangularly around a circle whose center lies on the given axis; and
electronic circuitry, coupled to the plurality of magnetic field sensors, for combining the respective sensed strengths into an output signal that represents an angle $\delta$ between a magnetization axis of the magnet and a fixed direction;
further wherein:
n denotes the total number of the plurality of magnetic field sensors;
$H_i$ denotes the strength, of the magnetic field perpendicular to the plane, sensed by an ith one of the magnetic field sensors; and
the electronic circuitry includes a main angle derivation circuit for combining the sensed strengths, from the total number n of the plurality of magnetic field sensors, into a main value for the angle $\delta$ according to the formula $$\delta = \tan^{-1}\left(\frac{\sum_{i=1}^{n} H_i \cdot \sin\left(2\pi\left(\frac{i-1}{n}\right)\right)}{\sum_{i=1}^{n} H_i \cdot \cos\left(2\pi\left(\frac{i-1}{n}\right)\right)}\right).$$

2. The sensor system of claim 1, wherein at least one of the magnetic field sensors comprises a Hall-effect plate sensor.

3. The sensor system of claim 1, wherein the magnet comprises a diametric cylinder magnet and the plurality of magnetic field sensors comprises at least four magnetic field sensors.

4. The sensor system of claim 1, wherein the magnet does not comprise a diametric cylinder magnet and the plurality of magnetic field sensors comprises at least five magnetic field sensors.

5. The sensor system of claim 1, wherein the electronic circuitry is configured for combining the sensed strengths in a manner that is insensitive to common-mode components of the magnetic field present at each of the magnetic field sensors.

6. The sensor system of claim 1, wherein the electronic circuitry further includes a plurality of subsidiary angle derivation circuits, each subsidiary angle derivation circuit for combining the sensed strengths, from a different subset of fewer than the total number of the plurality of magnetic field sensors, to form a respective redundant value for the angle $\delta$.

7. The sensor system of claim 6, wherein the electronic circuitry further includes a main angle comparator circuit for comparing the redundant values for the angle $\delta$ produced by each of the plurality of subsidiary angle derivation circuits to determine whether a magnetic field sensor is faulty.

8. The sensor system of claim 6, wherein the electronic circuitry further includes a main angle comparator circuit for determining a most likely value for the angle $\delta$ by comparing the redundant values for the angle $\delta$ according to a majority vote.

9. The sensor system of claim 6, further comprising a main angle comparator circuit and a redundant angle comparator circuit, both circuits for comparing the redundant values for the angle $\delta$.

10. A method of sensing rotation of a magnet about a given axis, the method comprising:

sensing a strength of the magnetic field parallel to the given axis, by each of a plurality of at least three magnetic field sensors arranged, in a plane perpendicular to the given axis, equiangularly around a circle whose center lies on the given axis; and combining the respective sensed strengths, by electronic circuitry coupled to the plurality of magnetic field sensors, into an output signal that represents an angle δ between a magnetization axis of the magnet and a fixed direction;

further wherein:

n denotes the total number of the plurality of magnetic field sensors;

$H_i$ denotes the strength, of the magnetic field perpendicular to the plane, sensed by an ith one of the magnetic field sensors; and the electronic circuitry includes a main angle derivation circuit for combining the sensed strengths, from the total number n of the plurality of magnetic field sensors, into a main value for the angle δ according to the formula $$\delta = \tan^{-1}\left(\frac{\Sigma_{i=1}^{n} H_i \cdot \sin\left(2\pi\left(\frac{i-1}{n}\right)\right)}{\Sigma_{i=1}^{n} H_i \cdot \cos\left(2\pi\left(\frac{i-1}{n}\right)\right)}\right).$$

11. The method of claim 10, wherein sensing the strength of the magnetic field by a magnetic field sensor comprises sensing using the Hall effect.

12. The method of claim 10, wherein the magnet comprises a diametric cylinder magnet and the plurality of magnetic field sensors comprises at least four magnetic field sensors.

13. The method of claim 10, wherein the magnet does not comprise a diametric cylinder magnet and the plurality of magnetic field sensors comprises at least five magnetic field sensors.

14. The method of claim 10, wherein combining the sensed strengths into the output signal comprises combining the sensed strength in a manner that is insensitive to common-mode components of the magnetic field present at each of the magnetic field sensors.

15. The method of claim 10, wherein combining the sensed strengths comprises combining sensed strengths, from each of a plurality of different subsets of fewer than the total number of the plurality of magnetic field sensors, to form a respective redundant value for the angle δ.

16. The method of claim 15, further comprising comparing the redundant values for the angle δ to determine whether one of the magnetic field sensors is faulty.

17. The method of claim 15, further comprising determining a most likely value for the angle δ by comparing the redundant values for the angle δ according to a majority vote.

18. The method of claim 15, further comprising comparing the redundant values for the angle δ by both a main angle comparator circuit and a redundant angle comparator circuit.

* * * * *

UNITED STATES PATENT AND TRADEMARK OFFICE
CERTIFICATE OF CORRECTION

PATENT NO. : 11,733,024 B2
APPLICATION NO. : 17/363732
DATED : August 22, 2023
INVENTOR(S) : Juan Manuel Cesaretti et al.

It is certified that error appears in the above-identified patent and that said Letters Patent is hereby corrected as shown below:

In the Specification

Column 4, Line 8, delete "is simplified diagram" and replace with --is a simplified diagram--.

Column 4, Line 42, delete "that opposite" and replace with --that is opposite--.

Column 7, Line 19, delete "is simplified diagram" and replace with --is a simplified diagram--.

Column 9, Line 66, delete "circuit, and" and replace with --circuit and--.

Column 10, Line 3, delete "channel A" and replace with --Channel A--.

Column 10, Line 22, delete "other potential impact" and replace with --other potential impacts--.

Column 11, Line 4, delete "the strength, of" and replace with --the strength of--.

Column 11, Line 32, delete "and/or according to a majority vote to" and replace with --and/or, according to a majority vote, to--.

Column 11, Line 57, delete "submitted that that" and replace with --submitted that the--.

Signed and Sealed this
Thirteenth Day of August, 2024

Katherine Kelly Vidal
*Director of the United States Patent and Trademark Office*